(12) United States Patent
Linson et al.

(10) Patent No.: US 12,092,757 B2
(45) Date of Patent: Sep. 17, 2024

(54) VEHICLE INSPECTION SYSTEM DUAL COLUMN SUPPORT STRUCTURE

(71) Applicant: Hunter Engineering Company, St. Louis, MO (US)

(72) Inventors: Dennis M. Linson, St. Charles, MO (US); Brian M. Cejka, Des Peres, MO (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 0 days.

(21) Appl. No.: 18/559,189

(22) PCT Filed: Aug. 10, 2023

(86) PCT No.: PCT/US2023/071999
§ 371 (c)(1),
(2) Date: Nov. 6, 2023

(87) PCT Pub. No.: WO2024/036262
PCT Pub. Date: Feb. 15, 2024

(65) Prior Publication Data
US 2024/0272277 A1    Aug. 15, 2024

Related U.S. Application Data

(60) Provisional application No. 63/397,670, filed on Aug. 12, 2022.

(51) Int. Cl.
*G01S 7/40*    (2006.01)
*G01S 13/931*    (2020.01)

(52) U.S. Cl.
CPC .............. *G01S 7/40* (2013.01); *G01S 13/931* (2013.01)

(58) Field of Classification Search
CPC ........ G01S 7/40; G01S 13/931; F16M 11/046
See application file for complete search history.

(56) References Cited

U.S. PATENT DOCUMENTS 6,498,959 B1 * 12/2002 January ................ G01B 11/275
356/138
10,323,936 B2 * 6/2019 Leikert .............. G01B 11/2755
(Continued)

FOREIGN PATENT DOCUMENTS

| CN | 114 720 152 A | 7/2022 |
| DE | 10 2018 215167 A1 | 3/2020 |

OTHER PUBLICATIONS

International Search Report and Written Opinion corresponding to PCT/US2023/071999 mailed on Oct. 26, 2023.

*Primary Examiner* — Peter M Bythrow
(74) *Attorney, Agent, or Firm* — Sandberg Phoenix & von Gontard P.C.

(57) ABSTRACT

A vehicle measurement and ADAS inspection and/or calibration system incorporating dual support columns arranged in a front-to-back configuration on a rolling base to achieve a low center of gravity. A vertically adjustable instrumentation and target support lateral crossbeam is mounted to a front column and is linked to a counterweight supported on a rear column by a driven cable and pulley assembly. A storage cabinet is additionally located on the wheeled base, partially enclosing a lower portion of the rear column, and extending forward towards the front column. Brake releases are operatively coupled to associated friction brake pads located below the base. The friction brake pads are biased into engagement with a supporting floor surface to prevent unintended movement of the base, and temporarily disengaged by operation of the associated brake releases.

18 Claims, 11 Drawing Sheets

(56) References Cited

U.S. PATENT DOCUMENTS

| | | | | |
|---|---|---|---|---|
| 10,634,488 | B2* | 4/2020 | Stieff | G01S 7/4972 |
| 10,921,426 | B2* | 2/2021 | Tang | G01S 7/4017 |
| 11,112,284 | B2* | 9/2021 | Bartkowiak | F16M 11/22 |
| 11,175,381 | B2* | 11/2021 | Wang | F16M 11/18 |
| 11,313,946 | B2* | 4/2022 | Cejka | G01S 7/40 |
| 11,674,634 | B2* | 6/2023 | Wang | F16M 11/24 |
| | | | | 73/1.81 |
| D1,000,988 | S * | 10/2023 | Wang | D8/499 |
| 11,982,528 | B2* | 5/2024 | Lai | B60S 5/00 |
| 2015/0108887 | A1* | 4/2015 | Linson | F16M 11/42 |
| | | | | 248/121 |
| 2019/0249985 | A1* | 8/2019 | Stieff | G01B 11/2755 |
| 2020/0150224 | A1* | 5/2020 | Cejka | G01S 13/931 |
| 2021/0048525 | A1* | 2/2021 | Lai | B25H 5/00 |
| 2021/0172769 | A1* | 6/2021 | Bartkowiak | F16M 11/22 |
| 2021/0381638 | A1* | 12/2021 | Lai | F16M 11/041 |
| 2022/0042794 | A1* | 2/2022 | Cejka | G01S 7/497 |
| 2022/0268885 | A1* | 8/2022 | Vianello | G06T 7/73 |

* cited by examiner

VEHICLE INSPECTION SYSTEM DUAL COLUMN SUPPORT STRUCTURE

CROSS-REFERENCE TO RELATED APPLICATIONS

The present application is the US National Stage under 35 U.S.C. § 371 et. seq. of International Application No. PCT/US2023/071999 filed on Aug. 10, 2023 which is related to, and claims priority from U.S. Provisional Patent Application Ser. No. 63/397,670 filed on Aug. 12, 2022, both of which are herein incorporated by reference.

STATEMENT REGARDING FEDERALLY SPONSORED RESEARCH

Not Applicable.

BACKGROUND OF THE INVENTION

The present application is related to a fixture for facilitating the calibration and/or inspection of vehicle onboard safety system sensors, together with measurement of a vehicle's relative position and/or wheel alignment, and in particular, to a movable structure configured with in-line dual columns to support a vertically adjustable instrumentation and target assembly in a stable condition.

Vehicle wheel measurement systems, such as wheel alignment or inspection systems employing machine vision technology, such as cameras configured to observe optical targets mounted on various surfaces within associated fields of view are well known in the vehicle measurement, wheel alignment, and inspection industry. Typically, these types of systems employ two or four cameras, mounted to a crossbeam member on a fixture or structure located in front of a vehicle service area. The structure supporting the camera crossbeam may be fixed in place or may be configured to be moved from one service area to another as needed using a wheeled base. The camera crossbeam itself may be vertically (and/or rotationally) adjustable along a single vertical column as shown in U.S. Pat. No. 10,634,488 B2 to Stieff et al. (herein incorporated by reference) to accommodate vehicles at different elevations of a lift rack within the vehicle service. Images acquired by the cameras are conveyed to a processing system configured with suitable software instructions for image evaluation, determining various spatial measurements associated with the observed surfaces or optical targets, and for identifying vehicle wheel alignment angles from the spatial measurements.

To inspect and calibrate various vehicle onboard safety system (ADAS) sensors, such as radar units, Lidar units, or optical sensors typically utilized in forward collision avoidance systems or adaptive cruise control systems, one or more observable targets are required to be precisely positioned in front of the vehicle, often with the aid of a vehicle measurement system such as a wheel alignment or inspection system. Various vehicle ADAS inspection and calibration systems provide an adjustable ADAS calibration target support mechanism on the camera crossbeam, such as shown in U.S. Pat. No. 10,634,448 to Stieff et al., or separately on the same single vertical column. In some known configurations, a pair of laterally spaced vertical columns are utilized in place of the single vertical column to support the camera crossbeam and/or an ADAS calibration target support mechanism. In each of these configurations, the overall dimensions of the system are typically greater in the vertical and side-to-side directions then in the front-to-back direction, resulting in an unstable system which inherently risks tipping over when moved forward or backwards (along the short dimension), as is often required for ADAS sensor inspection and/or calibration procedures.

Accordingly, there is a need in the automotive service and inspection field for a movable vehicle measurement/inspection/calibration system capable of supporting required ADAS calibration targets and other associated instrumentation over a range of vertical positions, and which is configured with a stable, low center of gravity to be highly resistant to accidental tipping or tilting, particularly during movement over sloped or uneven surfaces such as automotive shop floors.

BRIEF SUMMARY OF THE INVENTION

Briefly stated, the present disclosure sets forth a movable vehicle measurement and ADAS inspection and/or calibration system incorporating dual support columns arranged in an in-line front-to-back configuration on a wheeled base to achieve a low center of gravity. A vertically adjustable instrumentation and target support side-to-side crossbeam is mounted to a front column and is linked to a counterweight supported on a rear column by a driven cable and pulley assembly coupled across the upper end of each column. A storage cabinet is additionally located on the wheeled base, partially enclosing a lower portion of the rear column, and extending forward towards the front column. Individual brake releases are incorporated into at least one handle and are operatively coupled to left and right friction brake pads located below the wheeled base. The friction brake pads are biased into engagement with a supporting floor surface to prevent unintended movement of the wheeled base, and each temporarily disengaged by operation of an associated brake release.

In one embodiment, the front and rear columns each consist of separable upper and lower portions with a hinged coupling there between. The hinged coupling on each column enables the associated upper portion to fold laterally, reducing the overall height of the system for storage and/or transport.

In a further embodiment, a pair of handles providing the individual brake releases are rotationally coupled to associated sides of the storage cabinet. Each handle is rotatable between a rearward orientation operable from behind the system, and a forward orientation operable from in front of the system, enabling an operator to either push or pull the system during movement.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Turning to the figures, and to FIGS. 2A-5 in particular, an ADAS calibration support structure 100 is shown, including a generally rectangular base 102 having sufficient structure to define at least an upper surface supported above an underlying floor, and a front surface extending downward from the upper surface towards the underlying floor. A front column 104 extends vertically from the upper surface adjacent to the front surface of the base, while a rear column 106 spaced rearward from the front column 104 similarly extends vertically from the upper surface. In the embodiments shown in the figures, the front and rear columns 104, 106 are located on the lateral midline X of the base 102 but can be offset there from without departing from the scope of the invention.

Figure 6:
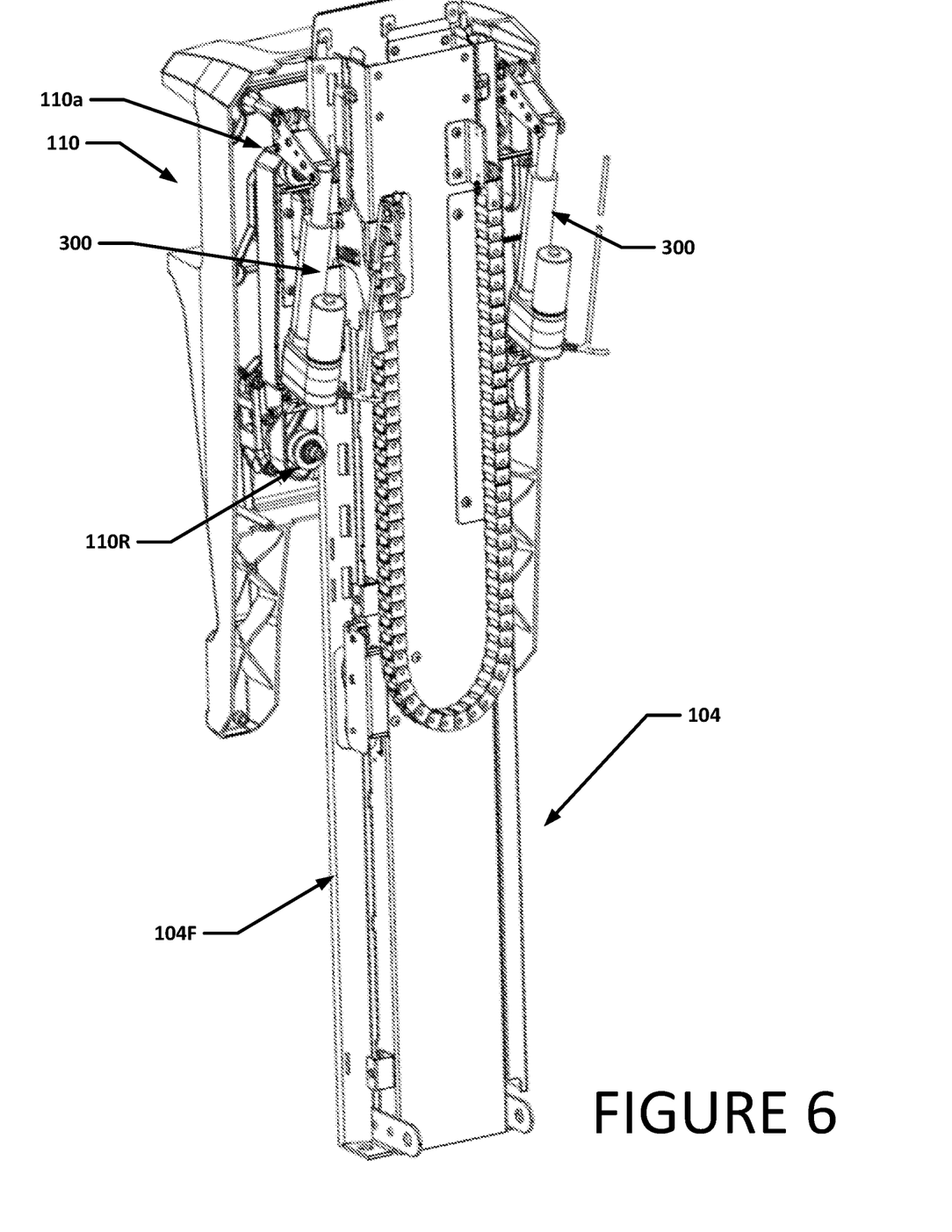
FIG. 6 is a rear perspective view of the camera boom and target structure attachment to the front support column of the ADAS calibration support structure of FIG. 2A, with an external cover removed.
Figure 7:
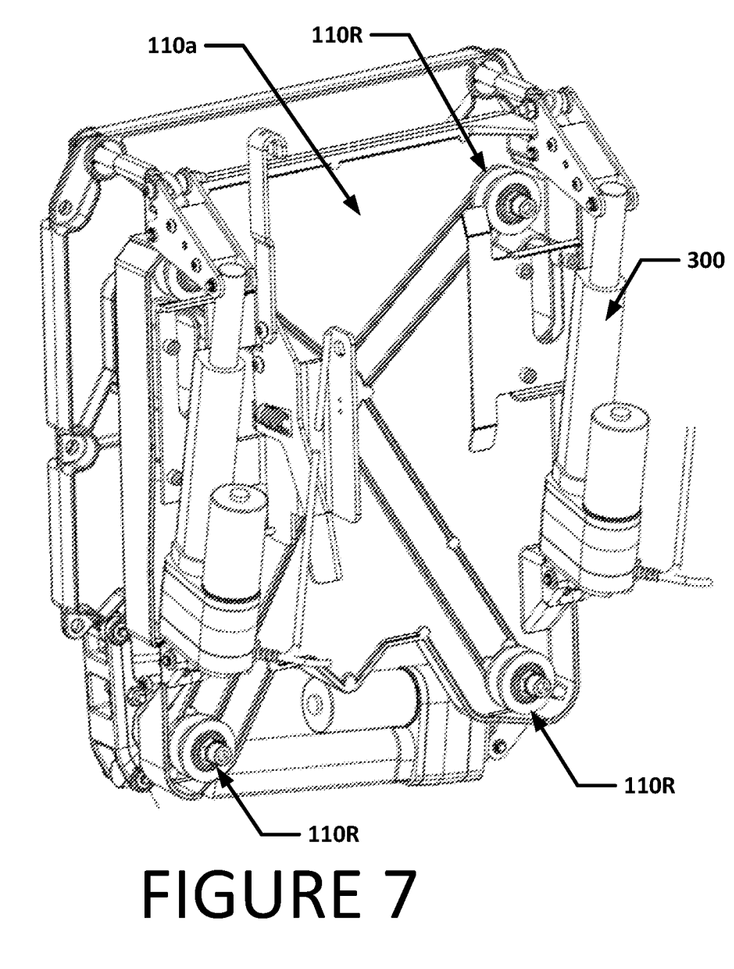
FIG. 7 is a perspective rear view of the support assembly coupling the camera boom and target structure to the front support column as shown in FIG. 6.
Figure 8:
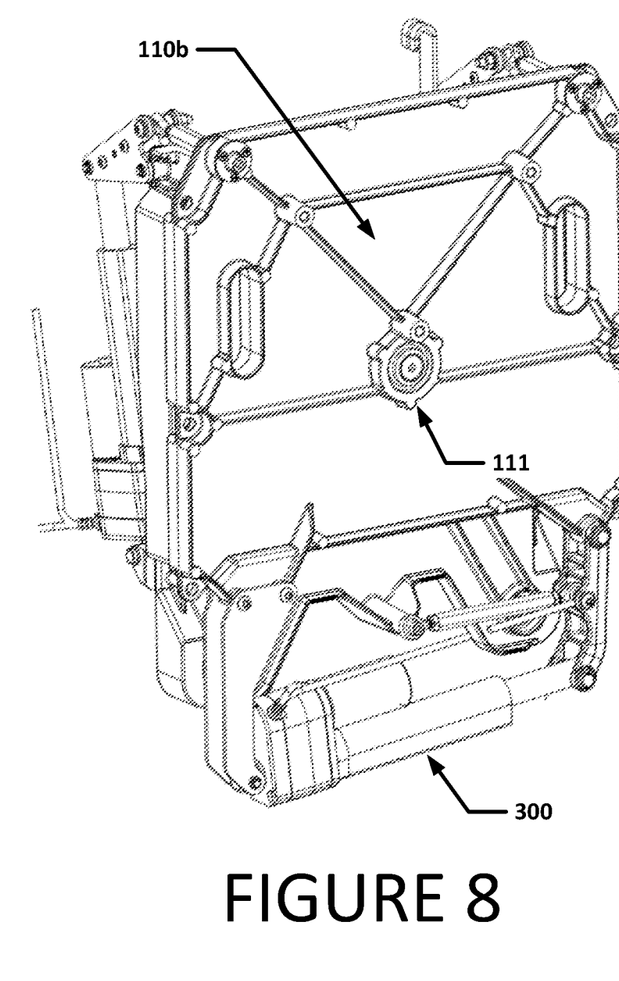
FIG. 8 is a front perspective view of the support assembly of FIG. 7.

A cabinet 108 is located between the front and rear columns. The cabinet 108 provides one or more storage compartments, accessible via drawers, shelves, and/or doors. As shown, the cabinet 108 partially encloses a lower portion of the rear column, and those of ordinary skill in the art will recognize that the cabinet may be configured to enclose a lower portion of the front column, the lower portions of both the front and rear columns, or neither column, without departing from the scope of the invention. A vertically movable mounting structure 110 supports an instrumentation crossbeam 112 and a target rail member 114 and is carried on the forward-facing side of the front column 104 as shown in FIG. 6. Vertical movement of the mounting structure 110 ranges between upper and lower limits along the front column 104. Additional multi-axis movement of the instrumentation crossbeam 112 and target rail member 114 is enabled by adjustment mechanisms within the mounting structure 110. As seen in FIGS. 6-8, the mounting structure 110 includes a back plate 110a which is secured to the front column 104 by a set of laterally spaced rollers 110R. Each roller 110R includes a circumferential channel which engages an outward facing vertical elongate guide flange 104F on a corresponding lateral side of the front column 104 to limit non-vertical movement. The rollers 110R and outward facing vertical elongated guide flanges 104F cooperatively retain the mounting structure 110 on the front column while facilitating smooth vertical movement by reducing lateral movement. Those of ordinary skill will recognize that alternative configurations for retaining the mounting structure 110 and reducing lateral movement during changes in the vertical position of the mounting structure 110, such as the rollers 110R traveling within elongated guide channels on the column 104, are within the scope of the invention.

A front plate 110b is coupled to the forward-facing side of the back plate 110a by a centrally disposed ball and socket joint 111 and secures the instrumentation crossbeam 112 and target rail member 114 in a fixed relationship. Movement of the front plate 110b relative to the back plate 110a by articulation about the ball and socket joint 111 provides a range of pitch, yaw, and roll movement for the front plate 110b, together with the associated instrumentation crossbeam 112 and target rail member 114. In one embodiment, the articulated movement is controlled by a set of linear actuators 300. Each linear actuator 300 is secured at a first end to the back plate 110a, and at an opposite end to the front plate 110b, such that extension or retraction of one or more of the linear actuators 300 articulates the front plate 110b about the ball and socket joint 111 relative to the back plate 110a. Each linear actuator 300 is operatively coupled to a control system and activated individually or in combination as required to achieve a desired orientation for the instrumentation crossbeam 112 and target rail member 114.

Figure 9:
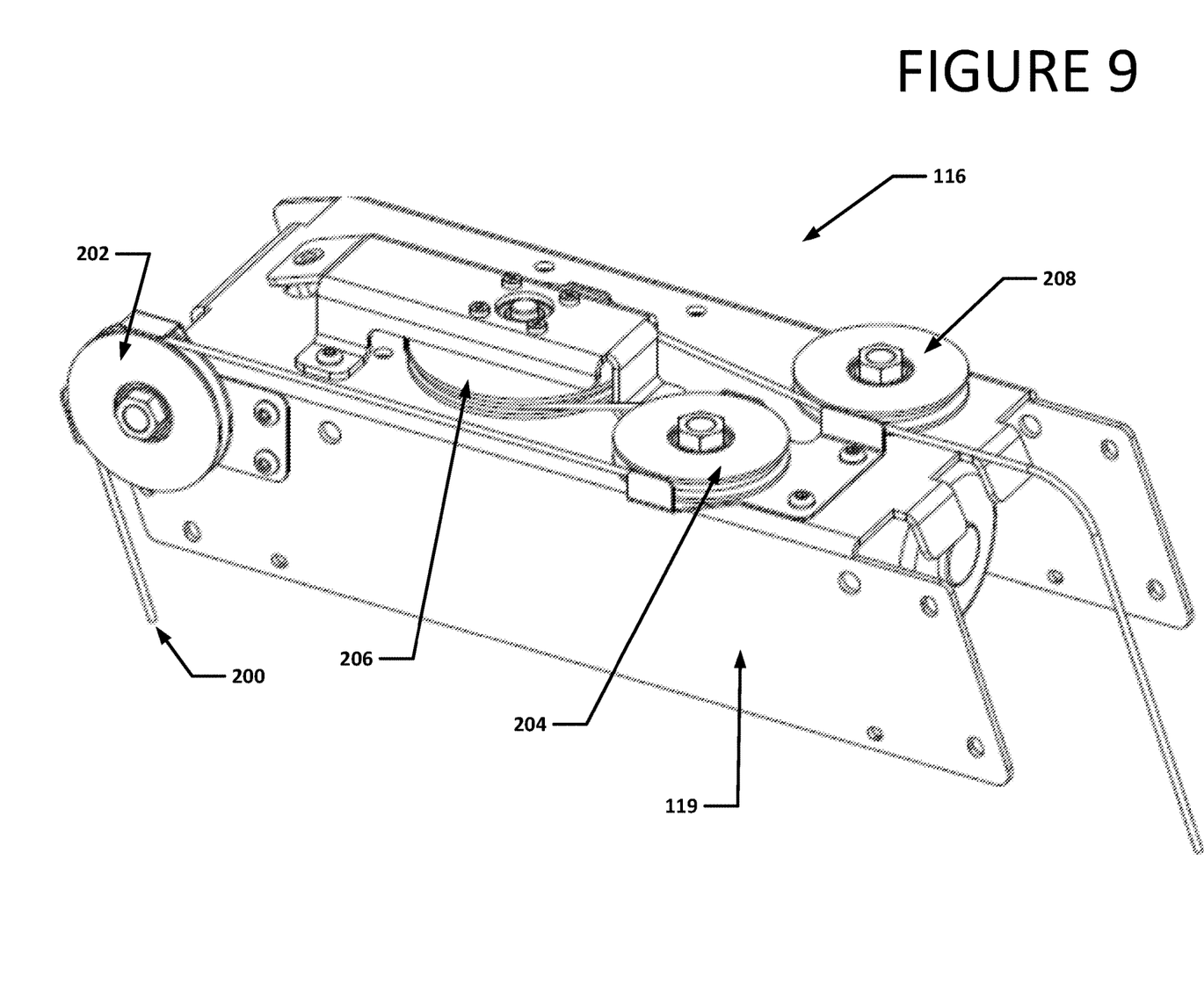
FIG. 9 is a top perspective view of the coupling between the front and rear support columns of the ADAS calibration support structure of FIG. 2A, illustrating a cable support and pulley arrangement coupled to the camera boom and target structure on the front support column, and a counterweight on the ear support column.
Figure 10:
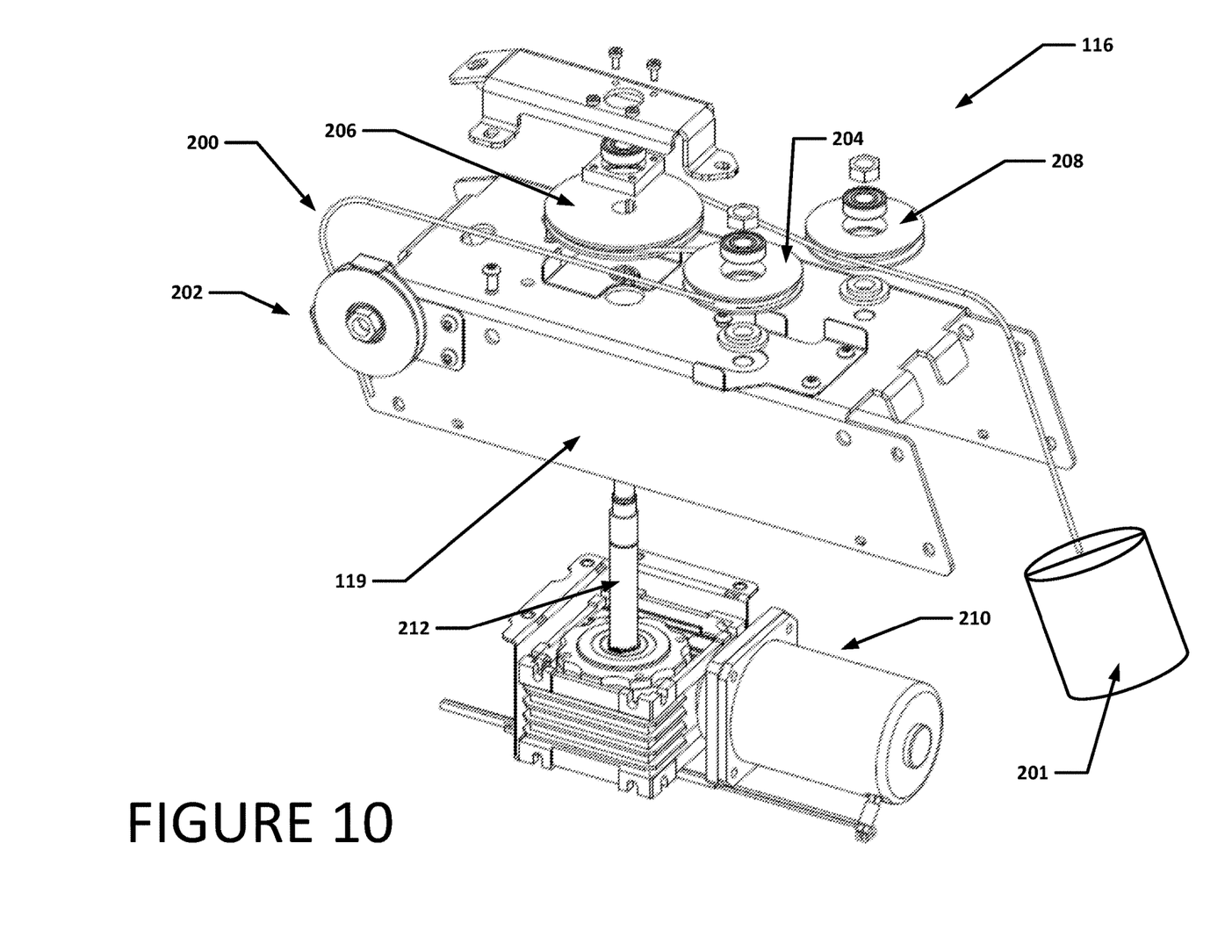
FIG. 10 is an exploded view of the components shown in FIG. 9, including a drive motor.

In one embodiment, smooth vertical movement of the mounting structure 110 along the front column 104 between the upper and lower limits is facilitated by coupling the mounting structure 110 to a counterweight 201 carried by the rear column 106 using a cable and pulley system 116. During vertical movement of the mounting structure 110 along the front column 104, the counterweight 201 moves in a vertically opposite direction, maintaining a low center of gravity for the support structure 100 between the front and rear columns, and reducing the amount of lifting force required to alter the elevation of the mounting structure 110 and supported instrumentation crossbeam 112 and target rail member 114. As seen in FIGS. 9 and 10, the cable and pulley system 116 includes a cable 200 which is secured at one end to the back plate 110a, and at an opposite end to the counterweight 201. Preferably the counterweight 201 is located within a hollow core of the rear column 106, but it may be located external to the rear column 106 without departing from the scope of the present disclosure. The cable is routed along the front column 104 and passes over a first pulley 202 to enter an enclosed bridge member 118 coupling the upper ends of the front and rear columns. Within the bridge member 118, a connecting frame 119 linking the front and rear columns supports a second pulley 204 to redirect the cable around a drive pulley 206. A third pulley 208 receives the cable from the drive pulley 206 and positions it for routing to the counterweight 201 supported by the rear column 106. A drive motor 210 secured beneath the connecting frame 119 is coupled to the drive pulley 206 by a shaft 212 and regulates the rotation there of. To raise the mounting structure 110 on the front column 104, the drive motor 210 is driven in a first rotational direction, rotating the drive pulley 206 to draw the cable upwards from the front column 104 and through the pulley system 116, correspondingly lowering the counterweight 201 at the rear column 106. To lower the mounting structure 110 on the front column, the drive motor 210 is driven in an opposite rotational direction, reversing the movement of the cable, counterweight 201, and mounting structure. When deactivated, the drive motor 210 remains stationary, resisting rotation of the drive pulley 206, holding the mounting structure 110 and counterweight 201 at current elevations relative to the front and rear columns. Those of ordinary skill in the art will recognize that a variety of arrangements for the cable and pulley system 116 and drive motor 210 can be utilized to achieve a desired range of movement for the mounting structure 110 and counterweight 201 and to maintain a stable center-of-gravity for the support structure 100 without departing from the scope of the invention. For example, the cable and pulley system 116 can be replaced by a functionally equivalent chain and sprocket system.

Locating the mounting structure 110 and the counterweight 201 on separate columns which are displaced from one another on the lateral midline X of the base 102, locates the center of gravity for the support structure 100 near the center of the base 102. Correspondingly, the mounting structure is located adjacent to a front edge of the base without compromising stability during either movement of the system 100 or elevation of the mounting structure on the column 104.

Those of ordinary skill in the art of vehicle measurement and ADAS calibration will recognize that a variety of components may be carried on the mounting structure 110 for positioning relative to a vehicle undergoing service. In one embodiment best seen in FIGS. 2A and 2B, the instrumentation crossbeam 112 supports at least one optical camera system 113 at each outboard end, as well as a pair of laterally spaced optical projectors 115 mounted on multi-axis gimbals 117, such as shown in U.S. Pat. No. 10,634,488 B2 to Stieff et al. The target rail member 114 provides one or more mounts 122 for receiving interchangeable ADAS calibration target panels such as radar-reflective targets 122a or optical targets (not shown). The mounts 122 are fixed in place on the target rail member 114 or are alternatively configured for movement along a horizonal axis of the rail, such as by engagement of rollers and tracks or any other suitable coupling permitting linear movement. Laser emitters and/or optical time-of-flight sensors may be carried by the mounts 122 to provide visual indications of a mount orientation and/or a measure of range to a surface located in front of the mounts 122. Alternatively, one or more electronic display panels, such as an LED display, capable of presenting images of ADAS calibration targets associated with a vehicle undergoing service recalled from a database by a connected processing system may be provided on the target rail member 114, coupled to the mounts 122, or otherwise affixed to the mounting structure 110.

Figure 1:
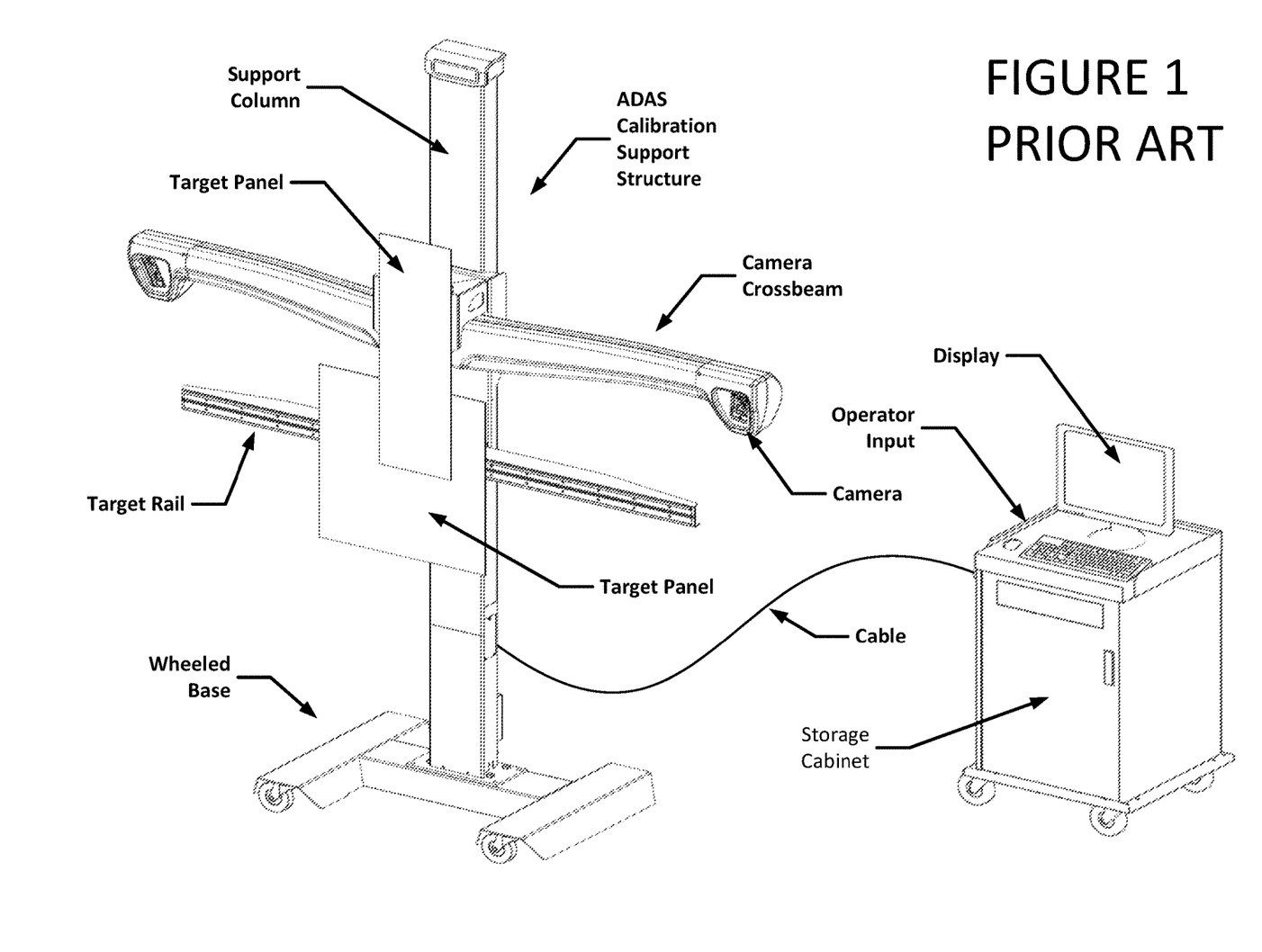
FIG. 1 is a perspective front view of a prior art vehicle ADAS calibration support structure having a single central column to support a camera boom and target structure, linked to a separate equipment cabinet.
Figure 2A:
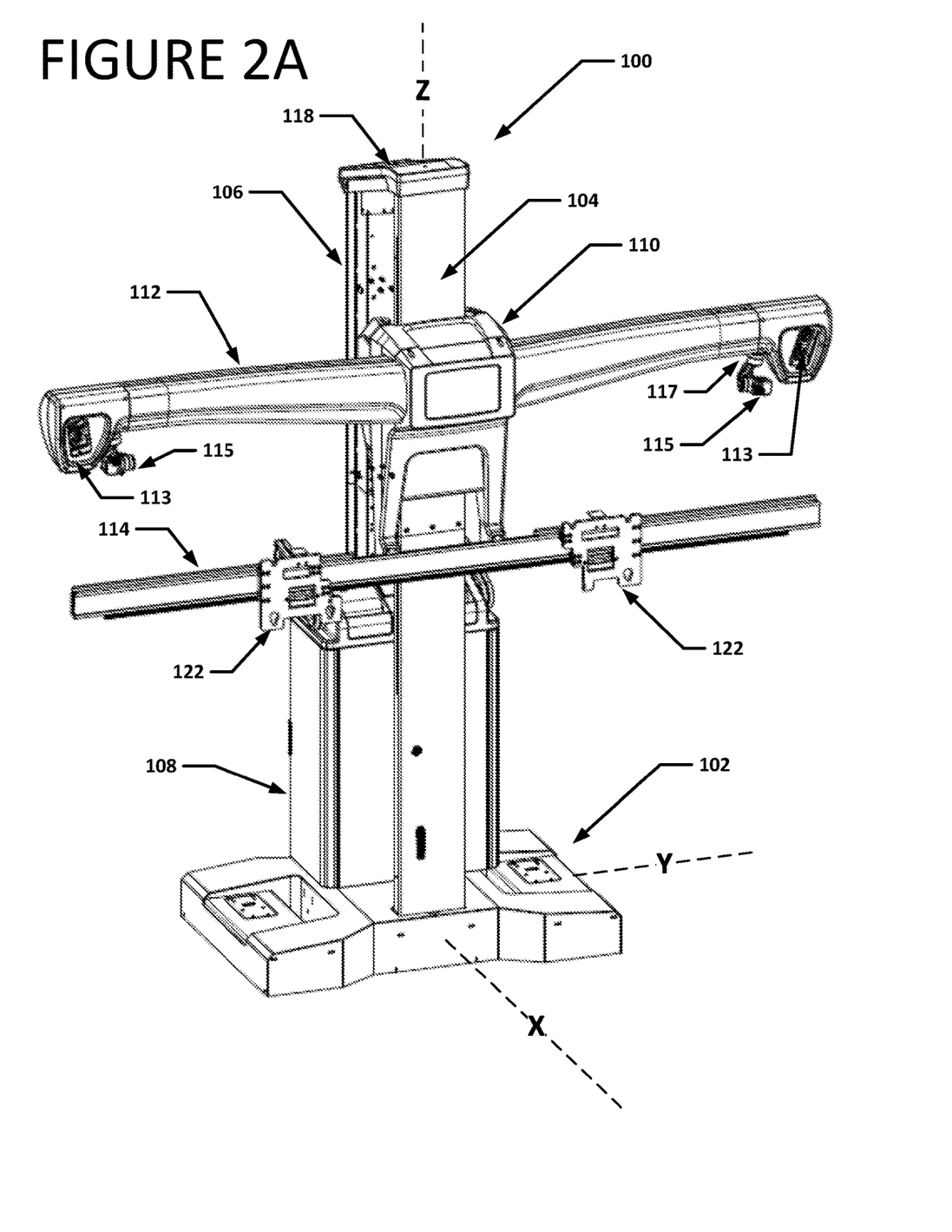
FIG. 2A is a perspective front view of a vehicle ADAS calibration support structure of the present disclosure, having a dual column support for a camera boom and target structure and an integrated equipment cabinet.

For some vehicle ADAS calibration procedures, a radar-reflective target panel 122a is positioned in front of the vehicle and in-line with the radar emitting ADAS sensor onboard the vehicle. It is generally preferable that no other radar-reflective surfaces be disposed within the region between the radar-reflective target panel 122a and the vehicle. With the target rail member 114 and mounts 122 carried by the instrumentation crossbeam 112 and mounting structure 110 on the front column 104, a radar-reflective target panel 122a secured to a mount 122 is positioned within the intervening space between the vehicle and the supporting structure of the system 100. Lowering the mounting structure 110 to a lower limit of vertical movement on the front column 104 positions the radar-reflective target panel 122a in front of the base 102, and optionally, in contact with the underlying floor, such as seen in FIG. 2A, accommodating vehicles having radar emitting ADAS sensors in lower locations.

To facilitate positioning the ADAS calibration support structure within a vehicle service area, the base 102 includes a set of rolling elements 102W, such as casters, or wheels, or a combination thereof. During use, the support structure 100 is manually rolled over the supporting floor surface toward a desired location, for example, a point located at a specific distance from a vehicle on the vehicle's centerline or thrust line. The support structure 100 incorporates a pair of handles 124 for an operator to hold while pushing or pulling the support structure 100. Each handle is rotatably coupled to a lateral side of the cabinet 108 for rotation about an axis R between a rearward orientation operable from behind the support structure 100, and a forward orientation operable from in front of the support structure 100, allowing an operator to easily hold the support structure 100 from either the front or the rear. Alternatively, a single bicycle-style handle may be provided at the rear of the support structure 100, without the ability to rotate between a rearward and forward orientation.

Figure 5:
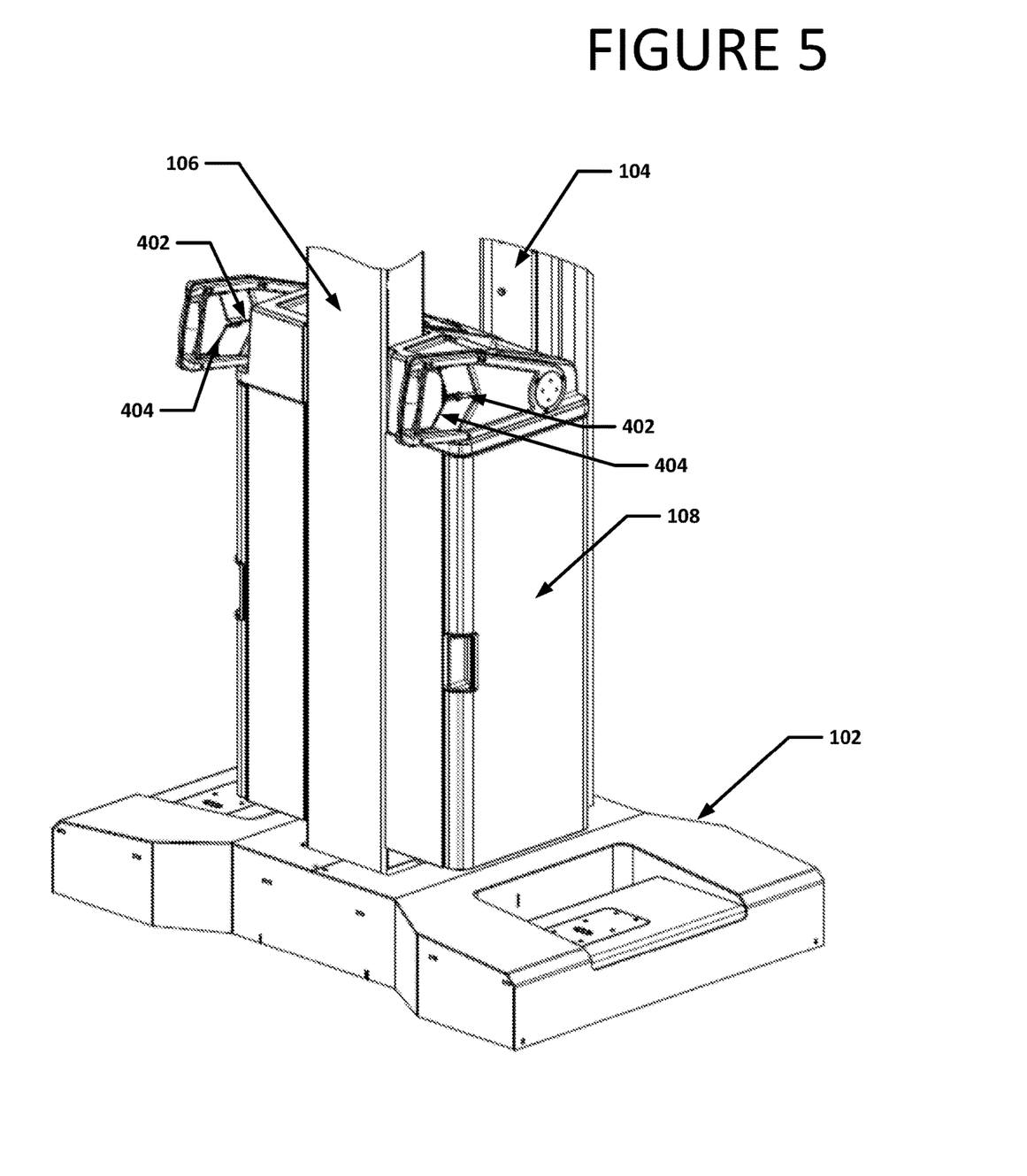
FIG. 5 is a close-up perspective rear view of the base, storage cabinet, and control handles of the ADAS calibration support structure of FIG. 2A.
Figure 11:
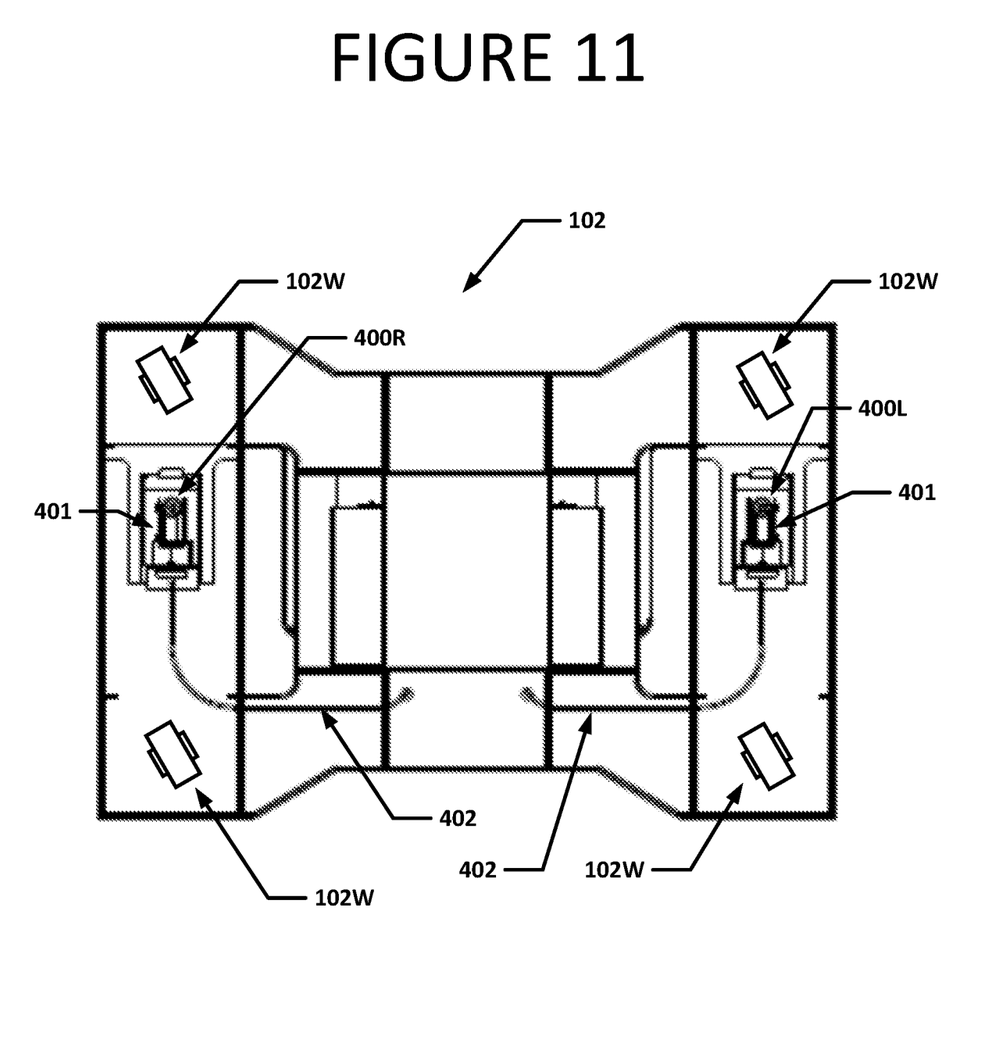
FIG. 11 is an underside view of the base, illustrating the set of brakes.

When the support structure 100 is positioned at a desired location within a vehicle service area, a brake mechanism included within the base 102 is activated to secure the support structure 100 against unintended movement. The brake mechanism consists of a left-side floor brake 400L and a right-side floor brake 400R, both of which are biased into an active or braking position. When activate, each brake 400L, 400R presses a high-friction brake pad 401 into contact with the floor surface, resisting movement of the base 102. Upon release of the brake, each high-friction brake pad 401 is elevated above the floor surface, and the base 102 is free to move across the floor surface on the rolling elements. Engagement of only one brake at a time provides a pivot axis about which the base 102 can be rotated on the floor surface, enabling fine positioning movements to be carried out by an operator. In one configuration, each brake 400L, 400R is spring biased towards the activated position, and coupled via a mechanical cable system 402, to an associated brake release 404 located at a corresponding handle 124 on the cabinet 108 as seen in FIG. 5. Manually engaging the brake release 404 by an operator while gripping the handle 124 disengages the associated brake and allows an operator to push, pull, or pivot the base 102 into a desired position.

Figure 2B:
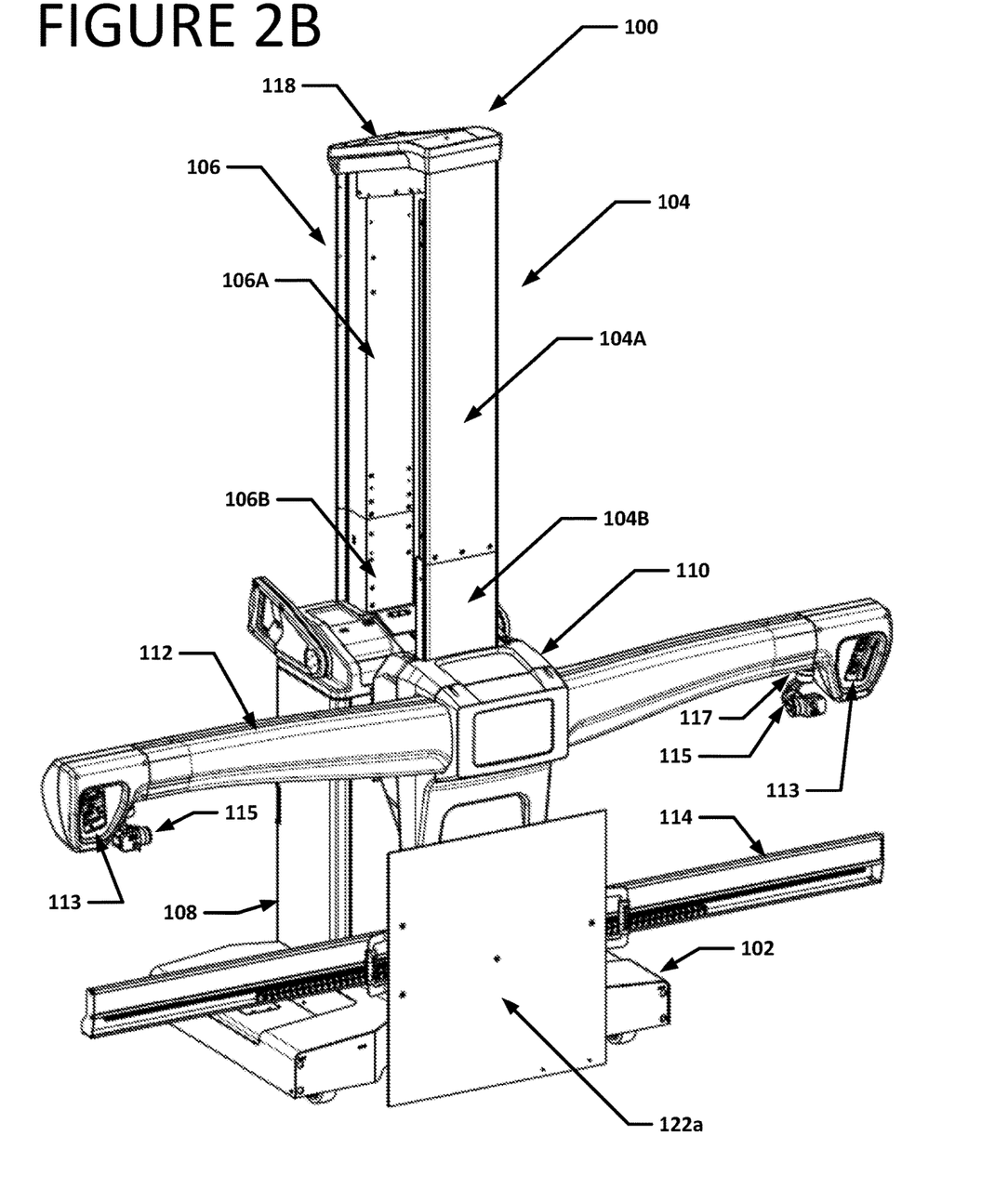
FIG. 2B is a perspective front view of a vehicle ADAS calibration support structure of the present disclosure as shown in FIG. 2A, with the camera boom and target structure mounting moved to the lowest vertical position.
Figure 3:
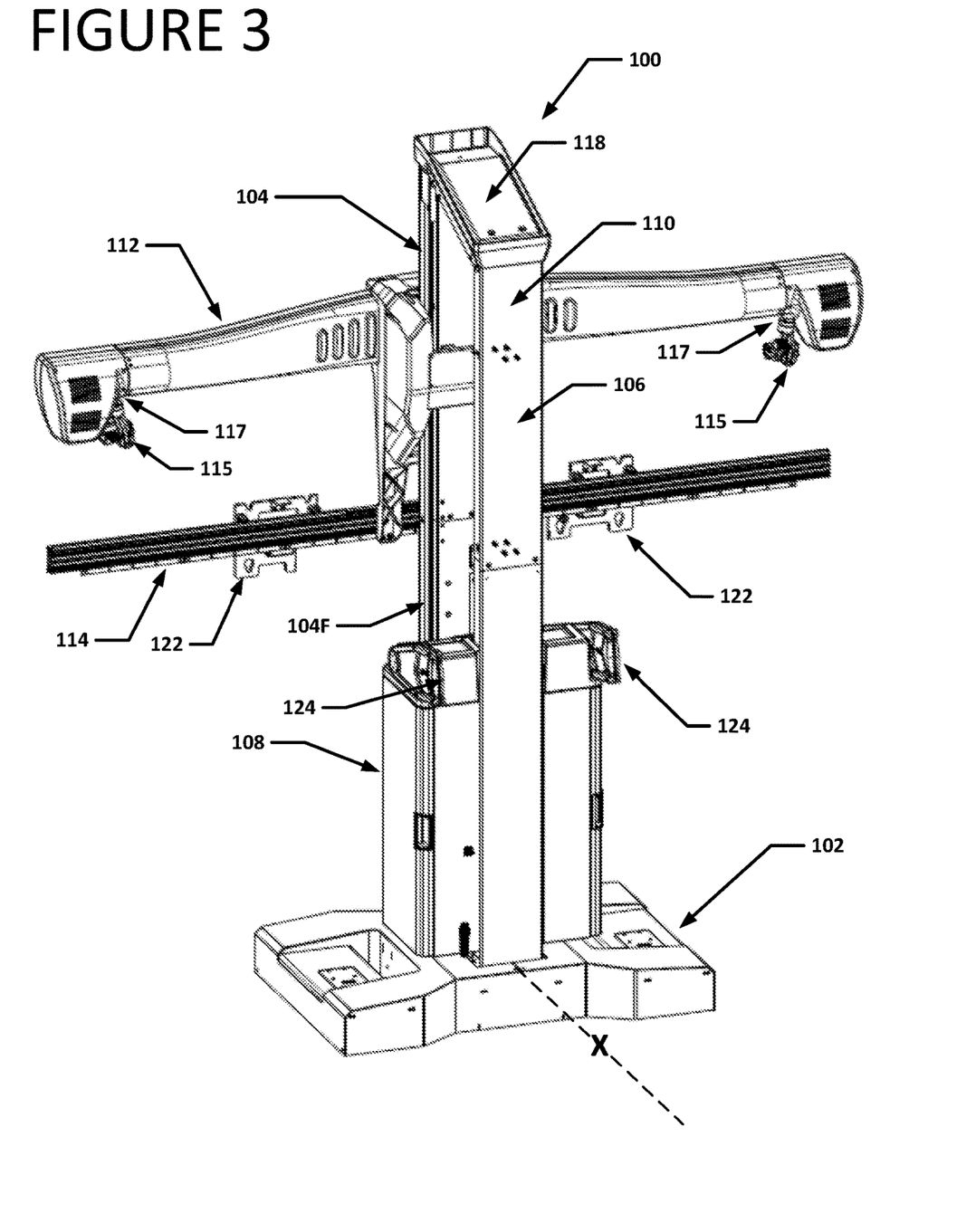
FIG. 3 is a rear perspective view of the ADAS calibration support structure of FIG. 2A.
Figure 4:
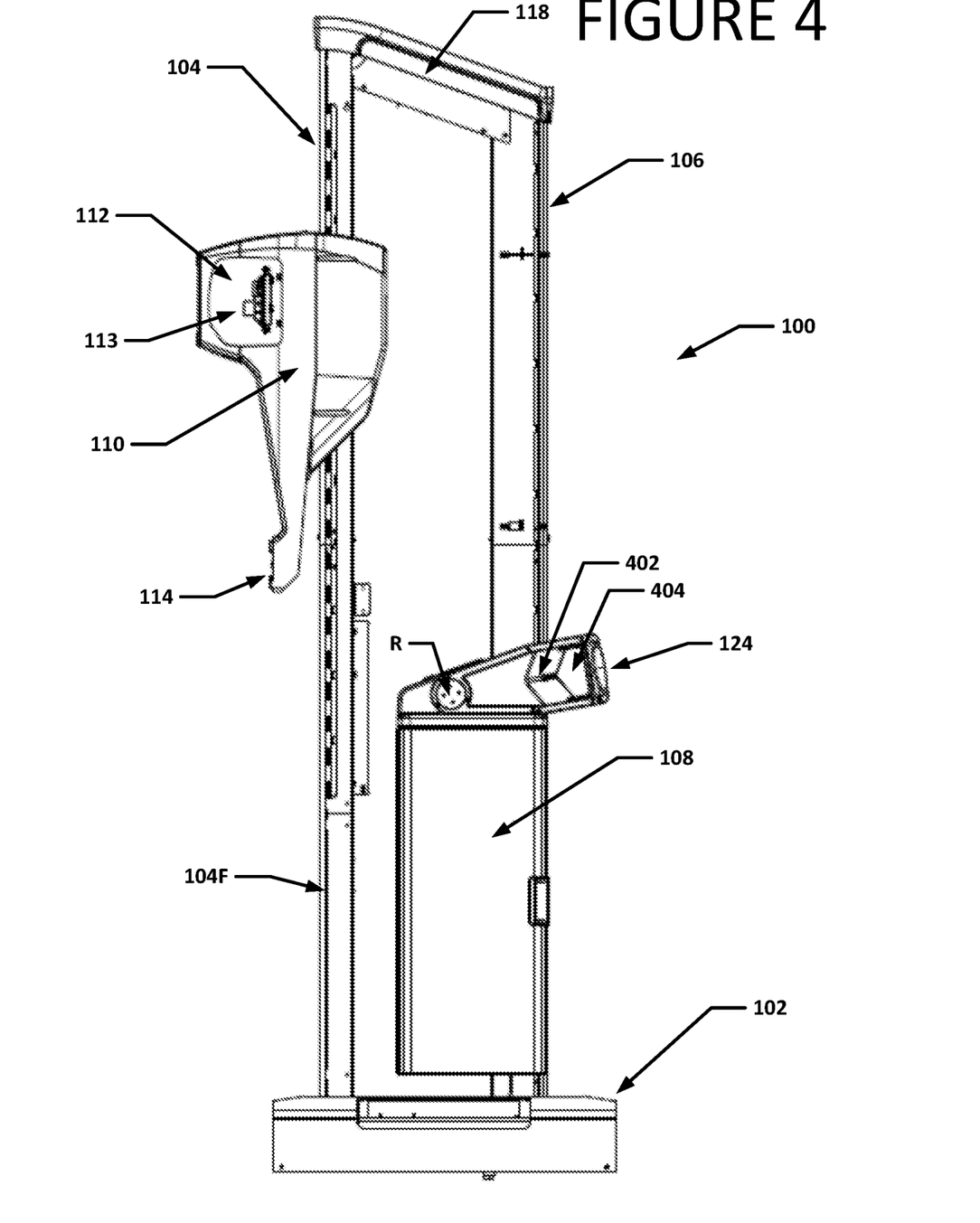
FIG. 4 is a left side view of the ADAS calibration support structure of FIG. 2A.

In some instances, it may be desired to transport the support structure 100 from one location to another, or to move the support structure 100 through a door or other opening having insufficient clearance for the front and rear columns. In one embodiment, the front column 104 and the rear column 106 are each formed with a separable upper portion 104A, 106A and lower portion 104B, 106B at a common height above the base. Each upper and lower portion is joined by a laterally positioned hinge and secured together with removable bolts. After lowering the instrumentation crossbeam 112 and mounting structure 110 onto the lower portion 104B of the front column 104 as seen in FIG. 2B, the removable bolts in each column are removed to permit the upper portions 104A, 106A of each column to fold laterally in unison at the hinges. Folding the upper portions in unison does not require disassembly of the support structure and reduces the overall height of the system for storage and/or transport.

Those of ordinary skill will recognize that while the aforementioned embodiments of the present disclosure are described as an ADAS calibration support structure, the use of the support structure is not limited to the calibration of vehicle ADAS sensors and may be utilized for other purposes without departing from the scope of the invention. For example, with suitable programming of a processing system, optical sensors carried on the instrumentation crossbeam 112 may be utilized to acquire images used to measure vehicle properties such as wheel alignment angles, record body damage, or perform vehicle identification. Targets carried on the target rail member 114 may be utilized for headlight aiming purposes. An electronic display coupled to the crossbeam or target rail may be utilized to display procedural instructions to an operator, as well as to display vehicle measurement results and/or service records.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A support structure for use during vehicle measurement and ADAS calibration procedures, comprising:
    a base;
    a front column mounted on said base;
    a rear column mounted on said base, said rear column spaced rearward from said front column;
    a bridge member coupling a top of said front column to a top of said rear column; and
    a mounting structure carrying an instrumentation crossbeam, said mounting structure supported for vertical movement along a forward face of said front column, said mounting structure operatively coupled to a vertically movable counterweight carried by said rear column.

2. The support structure of claim 1 wherein said base further includes a set of rolling elements on a lower surface, said rolling elements enabling movement of said base over a floor surface.

3. The support structure of claim 1 wherein said base further includes a pair of laterally spaced brakes, each brake having a friction surface biased to engage said floor surface beneath said base; and
    wherein each brake is operatively coupled to an associated release mechanism configured to withdraw said friction surface from engagement with said floor surface, whereby each of said brakes is independently operable.

4. The support structure of claim 3 wherein each brake is operatively coupled to said associated release mechanism by a cable, and
    wherein each release mechanism is a lever assembly configured to engage said associated cable when activated to withdraw said friction surface from engagement with said floor surface.

5. The support structure of claim 3 further including a storage cabinet disposed at least partially between said front and rear columns, said cabinet including left-side and right-side handles disposed on associated lateral sides;
    wherein said release mechanism for a left-side brake is associated with said left-side handle; and
    wherein said release mechanism for a right-side brake is associated with said right-side handle.

6. The support structure of claim 5 wherein said left-side handle and said right-side handle are each pivotally coupled to said cabinet for rotation about an axis between a forward-facing operable direction and a rearward facing operable direction.

7. The support structure of claim 1 wherein said mounting structure is operatively coupled to said vertically movable counterweight by a cable and pulley system traversing said bridge member.

8. The support structure of claim 7 wherein said cable and pulley system includes at least one drive pulley operatively coupled to a motor for controlled rotation about an axis, whereby rotation of said drive pulley in a first direction raises said mounting structure and lowers said counterweight, and whereby controlled rotation of said drive pulley in a second direction lowers said mounting structure and raises said counterweight.

9. The support structure of claim 8 wherein said motor is further configured to selectively hold said drive pulley against rotation, maintaining said mounting structure and counterweight vertical positions.

10. The support structure of claim 1 wherein said front column and said rear column each include an upper portion coupled to a lower portion by an associated hinge, whereby said upper portion of each column folds laterally in unison at said associated hinge to reduce an overall height of said support structure during storage or transport.

11. The support structure of claim 1 wherein said mounting structure includes a plurality of rollers mounted parallel to a rear surface, at least one of said rollers disposed adjacent to a first lateral side of said mounting structure, and at least one of said rollers disposed adjacent to a second lateral side of said mounting structure; and
    wherein said plurality of rollers engage opposite lateral sides of said front column to couple said mounting structure to said front column for vertical movement thereon.

12. The support structure of claim 11 wherein each lateral side of said front column includes an elongated guide configured to engage said rollers; and
    wherein each roller in said sets of rollers is restricted to vertical movement by said engagement with said elongated guide.

13. The support structure of claim 1 wherein said rear column is hollow, and wherein said vertically movable counterweight is contained within said rear column.

14. A vehicle measurement and ADAS calibration procedure support structure, comprising:
    a base having at least a front surface and an upper surface;
    a front column extending vertically from said upper surface of said base;
    a rear column extending vertically from said upper surface of said base, said rear column spaced rearward from said front column;

a bridge member coupling a top of said front column to a top of said rear column;

a mounting structure carrying an instrumentation crossbeam and at least one forward-facing target panel, said mounting structure supported for vertical movement between upper and lower limits along a forward face of said front column; and wherein, at said lower limit of said vertical movement, a bottom edge of said forward-facing target panel is disposed forward of said front surface of said base, and lower than said upper surface of said base.

15. The support structure of claim 14 wherein a bottom edge of said forward-facing target panel is in contact with a floor surface below said base at said lower limit of said vertical movement.

16. The support structure of claim 14 wherein said forward-facing target panel is a radar-reflective target panel.

17. The support structure of either claim 14 wherein said forward-facing target panel is an optical target.

18. The support structure of claim 14 wherein said mounting structure is operatively coupled to a vertically movable counterweight carried by said rear column.

\* \* \* \* \*